(12) United States Patent
Palaniswami

(10) Patent No.: US 11,700,428 B2
(45) Date of Patent: *Jul. 11, 2023

(54) SYSTEMS AND METHODS FOR PROVIDING MEDIA BASED ON A DETECTED LANGUAGE BEING SPOKEN

(71) Applicant: DISH NETWORK TECHNOLOGIES INDIA PRIVATE LIMITED, Bengaluru Karnataka (IN)

(72) Inventor: Rajesh Palaniswami, Kolar (IN)

(73) Assignee: DISH NETWORK TECHNOLOGIES INDIA PRIVATE LIMITED, Bengaluru Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,544

(22) Filed: Oct. 28, 2021

(65) Prior Publication Data

US 2022/0141540 A1  May 5, 2022

Related U.S. Application Data

(63) Continuation of application No. 17/084,486, filed on Oct. 29, 2020, now Pat. No. 11,190,851.

(51) Int. Cl.
| | |
|---|---|
| *H04N 21/485* | (2011.01) |
| *H04N 21/422* | (2011.01) |
| *G06F 40/263* | (2020.01) |
| *G06F 3/16* | (2006.01) |
| *G10L 15/00* | (2013.01) |
| *H04N 21/454* | (2011.01) |

(52) U.S. Cl.
CPC ........ *H04N 21/4856* (2013.01); *G06F 3/16* (2013.01); *G06F 40/263* (2020.01); *G10L 15/005* (2013.01); *H04N 21/42203* (2013.01); *H04N 21/42209* (2013.01); *H04N 21/454* (2013.01)

(58) Field of Classification Search
CPC ........ H04N 21/4856; H04N 21/42203; H04N 21/42209; H04N 21/454; G06F 40/263; G06F 3/16; G10L 15/005
See application file for complete search history.

(56) References Cited

U.S. PATENT DOCUMENTS

| | | | | |
|---|---|---|---|---|
| 9,135,245 | B1* | 9/2015 | Nijim | H04N 21/4668 |
| 11,190,851 | B1* | 11/2021 | Palaniswami | H04N 21/42209 |
| 2010/0023316 | A1* | 1/2010 | Knowles | G07C 13/00 |
| | | | | 455/466 |
| 2010/0333163 | A1* | 12/2010 | Daly | H04N 21/42204 |
| | | | | 704/275 |

(Continued)

*Primary Examiner* — Kyu Chae
(74) *Attorney, Agent, or Firm* — Jeremiah J. Baunach; VLP Law Group LLP

(57) ABSTRACT

Various embodiments provide media based on a detected language being spoken. In one embodiment, the system electronically detects which language of a plurality of languages is being spoken by a user, such during a conversation or while giving a voice command to the television. Based on which language of a plurality of languages is being spoken by the user, the system electronically presents media to the user that is in the detected language. For example, the media may be television channels and/or programs that are in the detected language and/or a program guide, such as a pop-up menu, including such media that are in the detected language.

16 Claims, 9 Drawing Sheets

(56) References Cited

U.S. PATENT DOCUMENTS

| | | |
|---|---|---|
| 2015/0106854 A1* | 4/2015 | Fabian-Isaacs .... H04N 21/4722 |
| | | 725/52 |
| 2017/0025116 A1* | 1/2017 | Mehra ..................... G06F 40/58 |
| 2017/0111704 A1* | 4/2017 | Ellis .................. H04N 21/4312 |
| 2018/0220195 A1* | 8/2018 | Panchaksharaiah .. G10L 15/005 |
| 2018/0324236 A1* | 11/2018 | Tribolet ................. H04L 47/25 |
| 2019/0158929 A1* | 5/2019 | Sreedhara, Sr. ... H04N 21/4722 |
| 2020/0020316 A1* | 1/2020 | Des Jardins ............ G10L 15/22 |

\* cited by examiner

US 11,700,428 B2

SYSTEMS AND METHODS FOR PROVIDING MEDIA BASED ON A DETECTED LANGUAGE BEING SPOKEN

TECHNICAL FIELD

The technical field relates to electronically presenting media and more particularly, to apparatus, systems and methods for providing media based on a electronically detected language being spoken.

BRIEF SUMMARY

Systems and methods for providing media based on a detected language being spoken are provided. Media such as television channels and programs are available in a variety of different languages. However, it is often difficult and inconvenient to find such channels and programming in a particular language, especially when using an unfamiliar television or set-top box, such as when traveling and staying in hotels or other temporary accommodations. To solve this technical problem, the systems and methods described herein automatically detect the language being spoken by the user (e.g., during a conversation or while giving a voice command to the remote control or television) and electronically present media to the user that are in the detected language (e.g., television channels, programs and/or program guides highlighting such media).

For example, such a system may be used in hotel rooms that often receive international travelers. The user would be able to immediately enjoy programming in a language they understand by merely speaking their own language, without having to view each channel to search for programs in their own language or search the program guide that is unfamiliar and perhaps in a different language than the user understands.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
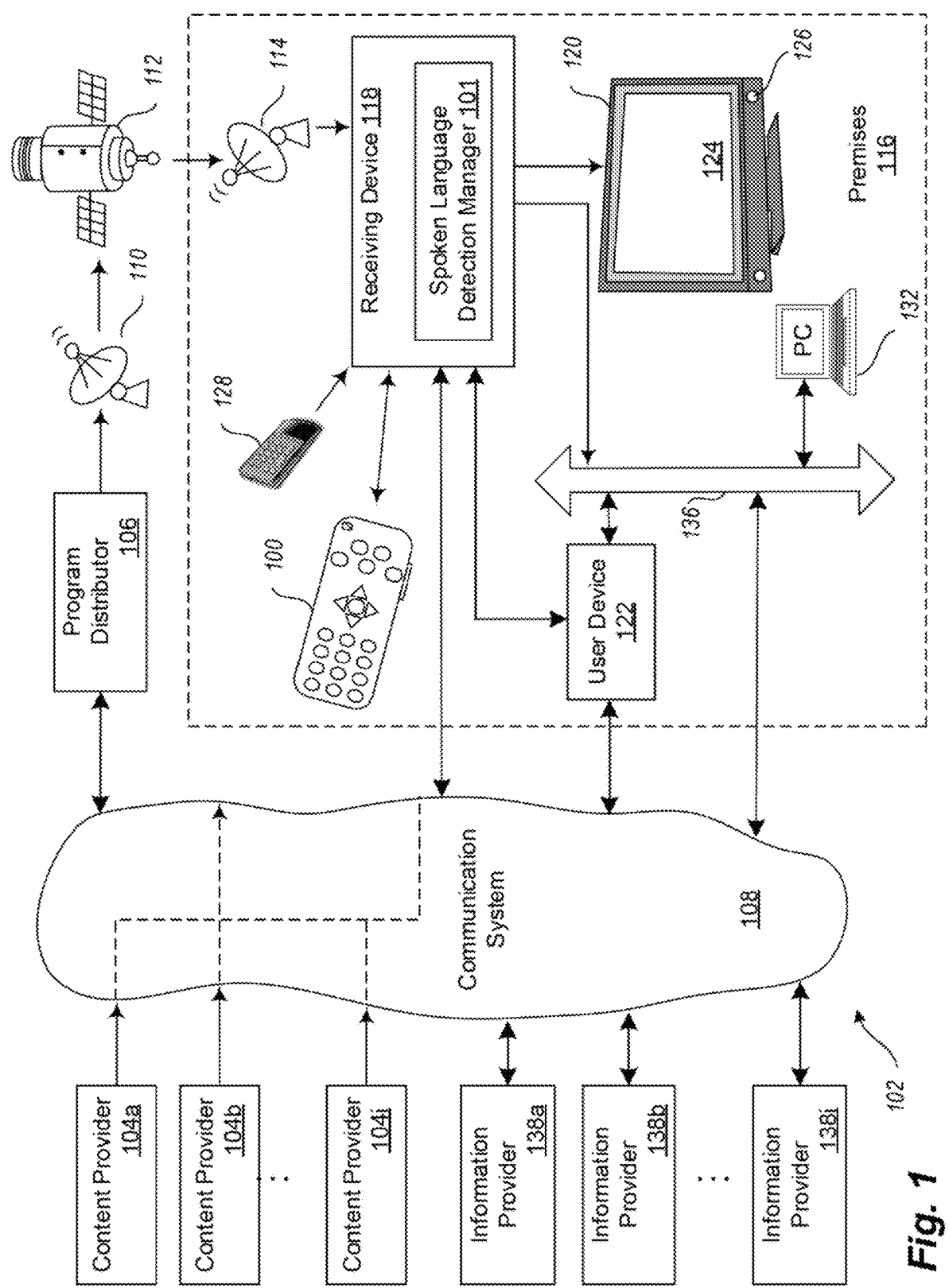
FIG. 1 is a block diagram illustrating an example communication system in which embodiments of systems and methods for providing media based on a detected language being spoken may be implemented.

FIG. 1 is an overview block diagram illustrating an example communication system 102 in which embodiments of systems and methods for providing media based on a detected language being spoken may be implemented. It is to be appreciated that FIG. 1 illustrates just one example of a communications system 102 and that the various embodiments discussed herein are not limited to such systems. Communication system 102 can include a variety of communication systems and can use a variety of communication media including, but not limited to, satellite wireless media.

Audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," "smartphone", "device" and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device 128 is operable to control the presentation device 120 and other user devices 122.

Examples of a presentation device 120 include, but are not limited to, a television ("TV"), a personal computer ("PC"), a sound system receiver, a digital video recorder ("DVR"), a smartphone, a tablet device, a wireless device, a user device, game system, or the like. Presentation devices 120 employ a display 124, one or more speakers, and/or other output devices to communicate video and/or audio content to a user. In many implementations, one or more presentation devices 120 reside in or near a premises 116 (e.g., a premises, a hotel room, a venue, a business premises, etc.) and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television or streaming content or audio content, to a distributor, such as the program distributor 106. Example content providers 104a-104i include television stations which provide local or national television programming or streaming content, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at premises 116. Examples of premises 116 include a residence, a business, hotel, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes. In some embodiments, the receiver antenna 114 may be remotely located from the premises 116. For example, the antenna 114 may be located on the roof of an apartment building, such that the received signals may be transmitted, after possible recoding, via cable or other mechanisms, such as WiFi, to the premises 116.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device (e.g., smartphone, tablet device, notebook computer or other mobile device) that is operable to receive a signal from the receiving device 118, another endpoint device, or from other devices external to the premises 116, such as via a cellular signal and/or the Internet via communication system 108. Additional non-limiting examples of user device 122 include optical media recorders, such, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote-control device ("remote") 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The receiving device 118 may receive programming partially from, or entirely from, another source other than the above-described receiver antenna 114, such as streaming media sources via the Internet. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Premises 116 may include other devices which are communicatively coupled to communication system 108 via a suitable media. For example, but not limited to, some premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, a WiFi network or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the premises 116 may be directly connected to the communication system 108, such as the PC 132, which may employ a hardwire connection or an RF signal for coupling to communication system 108. In some embodiments, devices shown in FIG. 1, such as user device 122, remote 128 and voice enabled remote-control device 100 may be operably coupled to the receiving device 118 via a short range wireless or point-to-point connections, such a Bluetooth® connection.

A plurality of information providers 138a-138i are coupled to communication system 108. Information providers 138a-138i may provide various forms of content and/or services to the various devices residing in the premises 116.

For example, information provider 138a may provide requested information of interest to PC 132 or user device 122. Information providers 138a-138i may further provide language information, electronic program guide (EPG) information and other metadata indicative of which language particular programming or channels are in.

In the illustrated example, the system for providing media based on a detected language being spoken includes a voice enabled remote-control device 100 and a spoken language detection manager 101 operating upon the receiving device 118. The voice enabled remote-control device 100 supports dual interaction modalities of voice and keypad input. Specifically, the voice enabled remote-control device 100 includes an audio input device (not shown), such as a microphone, as well as a keypad including one or more buttons. The system for providing media based on a detected language being spoken is operable to electronically detect (via the voice enabled remote-control device 100) which language of a plurality of languages is being spoken by a user on the premises 116. Based on which language is detected as being spoken by the user, the spoken language detection manager 101 is operable to electronically select and present media (e.g., via the presentation device 120) to the user that is in the detected language.

The system for providing media based on a detected language being spoken then uses the detected language to control the receiving device 118. For example, if the detected language being spoken is French (such as when the user is talking in a conversation to another person while in premises 116), the receiving device 118 may electronically select one or more television channels of the program distributor 106 that are in French. The receiving device 118 may then automatically present (e.g., as a pop-up menu) on the display 124 a selectable list those television channels that are in French (e.g., are broadcast in French, have French audio tracks, that are from French television stations, include French programs and/or are otherwise associated with the French language). As another example, if the detected language is French, the receiving device 118 may automatically switch to a French television channel, or, the next time the user presses a button on the remote 128 or voice enabled remote-control 100 to bring up an electronic program guide (EPG), the receiving device 118 may instead present a customized French EPG that includes a selectable list of French channels (e.g., channels that are in French) first before other channels that are not in French.

In other embodiments, the system for providing media based on a detected language being spoken may include additional components or be structured in other ways. For example, functions of the spoken language detection manager 101 may be distributed between the receiving device 118 and the voice enabled remote-control device 100. As another example, the spoken language detection manager 101 or similar component may operate upon (e.g., execute in) other media devices, including the presentation device 120, the user device 122, and the like. Furthermore, the spoken language detection manager 101, situated within a first device (such as the receiving device 118), can be configured to control other, remote media devices, such as the user device 122, presentation device 120, and the like.

The system for providing media based on a detected language being spoken provides numerous advantages. For example, such a system may be used in hotel rooms that often receive international travelers. The user would be able to immediately enjoy programming in a language they understand by merely speaking their own language, without having to view each channel to search for programs in their own language or search the program guide that is unfamiliar and perhaps in a different language than the user understands.

The above description of the communication system 102 and the premises 116, and the various devices therein, is intended as a broad, non-limiting overview of an example environment in which various embodiments of a system for providing media based on a detected language being spoken may be implemented. The communication system 102 and the various devices therein, may contain other devices, systems and/or media not specifically described herein.

Example embodiments described herein provide applications, tools, data structures and other support to implement a system for providing media based on a detected language being spoken. Other embodiments of the described techniques may be used for other purposes, including for interaction with, and control of, remote systems generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
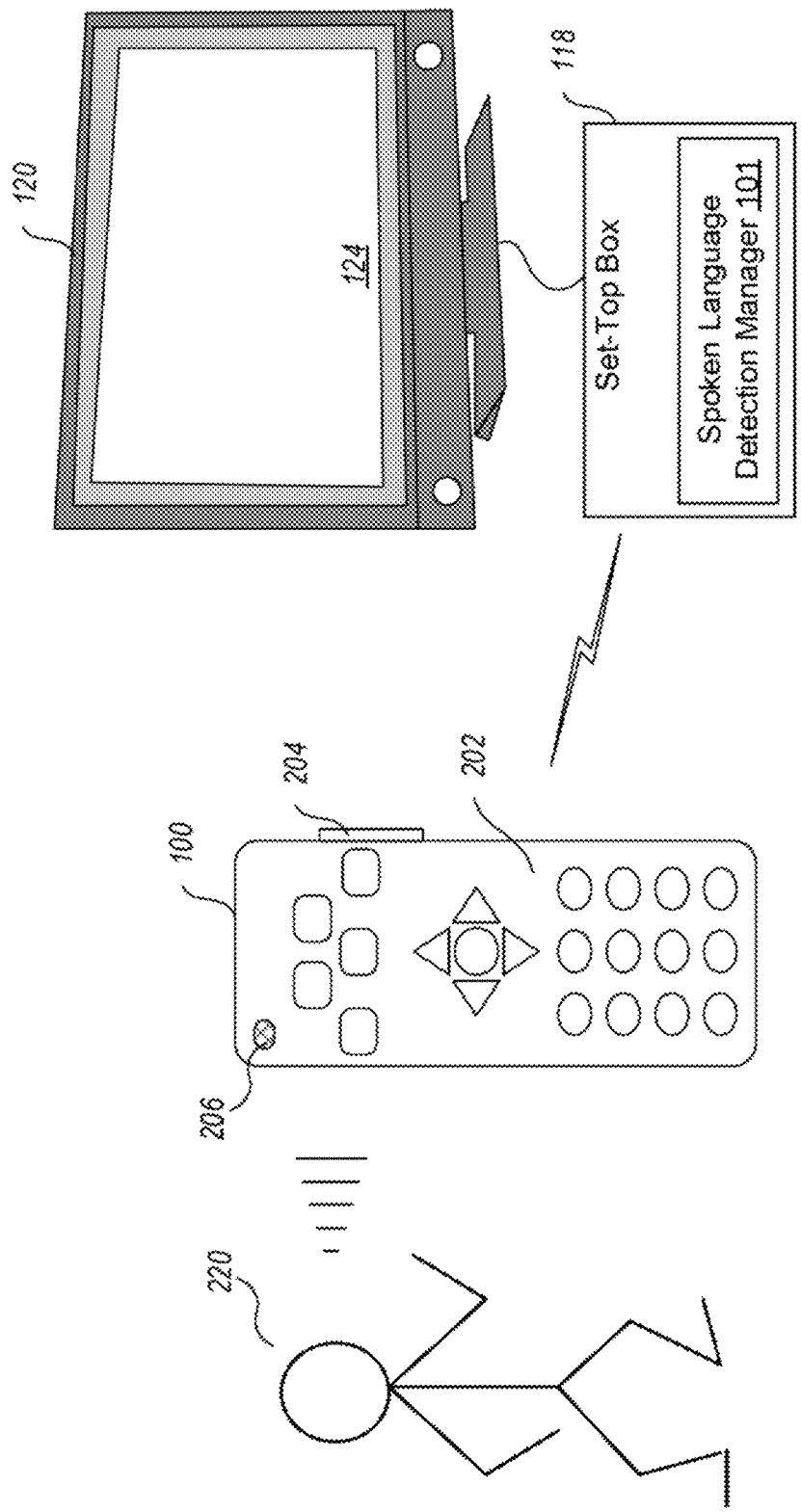
FIG. 2 is a block diagram illustrating example functional elements of an example embodiment.

FIG. 2 is a block diagram illustrating example functional elements of an example embodiment. In the example of FIG. 2, the system for providing media based on a detected language being spoken includes a receiving device 118, a voice enabled remote-control device 100, and a presentation device 120. A spoken language detection manager 101 is executing on the receiving device 118, which is a set-top box in this particular example. The receiving device 118 is communicatively coupled to the presentation device 120. As noted, the receiving device 118 may be communicatively coupled to other media devices, such as a video recorder or audio system, so as to control those media devices based on the detected language being spoken by the user 220.

The receiving device 118 is also wirelessly communicatively coupled to the voice enabled remote-control device 100. In the illustrated embodiment, the receiving device 118 and voice enabled remote-control device 100 communicate using radio frequency (e.g., UHF) transmissions. In other embodiments, other communication techniques/spectra may be utilized, such as infrared ("IR"), microwave, short range wireless connections (e.g., Bluetooth® connections) or the like. The remote-control device 100 includes a keypad 202 having multiple buttons (keys), an optional language detection key 204, and a microphone 206. The keypad 202 includes multiple keys that are each associated with a particular command that can be generated by the voice enabled remote-control device 100 and transmitted to the receiving device 118. The optional language detection key 204, I some embodiments, provides push-to-talk capability for the voice enabled remote-control device 100. When the user 220 pushes or otherwise activates the language detection key 204, the voice enabled remote-control device 100 begins to receive or capture audio signals received by the microphone 206, and to initiate the voice recognition and language detection process, here performed by the spoken language detection manager 101, as described below. However, in other embodiments, there is no such language detection key and the voice enabled remote-control device 100 is in either a constant or a default state to receive or capture audio signals received by the microphone 206 and to perform the voice recognition and language detection process disclosed herein.

In the illustrated embodiment, the user 220 can speak anything in a particular language and the voice enabled remote-control device 100 begins to transmit an audio signal provided by the microphone 206 to the receiving device 118. The audio signal represents the language being spoken by the user, and may do so in various ways, including in analog or digital formats. In one example, the voice enabled remote-control device 100 digitally samples an analog signal provided by the microphone 206, and transmits the digital samples to the spoken language detection manager 101 of the receiving device 118. The digital samples are transmitted in a streaming fashion, such that the voice enabled remote-control device 100 sends samples as soon as, or nearly as soon as, they are generated by the microphone 206 or other sampling component. The spoken language detection manager 101 receives the audio signal and performs speech recognition to determine the spoken command. The spoken language detection manager 101 includes a speech recognizer that consumes as input audio data representing a spoken utterance, and provides as output a textual representation of the spoken utterance. Furthermore, the speech recognition and language detection may be configured to operate in substantially real time. For example, if the spoken language detection manager 101 receives speech audio samples sent in a streaming fashion by the voice enabled remote-control device 100, then the spoken language detection manager 101 can initiate speech recognition and language detection as soon as one or more initial speech audio samples are received, so that the language detection can begin to operate shortly after the user 220 begins their utterance.

The spoken language detection manager 101 may also perform various signal processing tasks prior to providing audio data to the speech recognizer. In one embodiment, the spoken language detection manager 101 subtracts, from the audio data received from the voice enabled remote-control device 100, the output audio signal provided by the receiving device 118. In this manner, the performance of the speech recognizer may be improved by removing from the received audio data any audio that is part of a program being currently presented by the receiving device 118. The spoken language detection manager 101 may perform other signal processing functions, such as noise reduction, noise cancelation, signal equalization, echo cancellation, or filtering, prior to providing the received audio data to the speech recognizer.

Upon detecting the language being spoken, the spoken language detection manager 101 initiates a receiving device command corresponding to the detected language. For example, if the detected language is Hindi, then the receiving device 118 may present media via the presentation device 120 that is in Hindi (e.g., a channel, a program, programming, a channel or program guide, channel or program suggestions, instructions, a help menu, a prompt, an audio track, and/or subtitles, etc., that are in Hindi). With respect to visual media, it may be presented on display 124. In some embodiments, the receiving device 118 may cause the presentation device 120 to first prompt the user (e.g., with an audio and/or visual prompt in the detected language and also in a default language) to confirm the detected language is correct and whether to proceed with presenting media in the detected language.

In some embodiments, the voice enabled remote-control device 100 accepts voice commands via microphone 206 to control the receiving device 118 and presentation device 120. Is such embodiments, the voice enabled remote-control device 100 or receiving device 118 interprets the voice command given, executes the command, and may detect which language the command is given in. The receiving device 118 may then proceed to present media as described herein based on the detected language the command is given in after or in conjunction with executing the command. For example, if the user 220 tells the remote-control device 100 via a voice command in Italian to mute the volume, the receiving device 118 may receive the command, detect that it is in Italian, interpret the command based on the detection that it is in Italian, and then mute the volume of the presentation device 120 accordingly. The receiving device 118 may then present media (e.g., a menu in Italian of Italian channels or programs that are in Italian) based on the detection that the command to mute the volume was in Italian.

In general, the spoken language detection manager 101 can access any operational state or capability of the receiving device 118 based on the detected language. In various embodiments, the spoken language detection manager 101 may provide access to only some subset of the capabilities of the receiving device 118, limited for example to those capabilities that are frequently used by typical users.

In the above example, the spoken language detection manager 101 performed all or substantially all aspects of speech recognition and language detection upon audio data received from the voice enabled remote-control device 100. In other embodiments, speech recognition and language detection may be performed in other ways or at other locations. For example, in one embodiment, the voice enabled remote-control device 100 may include a speech recognizer and language detector, such that substantially all speech recognition and language detection is performed at the voice enabled remote-control device 100. In another embodiment, the performance of various speech recognition and/or language detection tasks is distributed between the voice enabled remote-control device 100 and the spoken language detection manager 101. For example, the voice enabled remote-control device 100 may be configured to extract information about the audio signal, such as acoustic features (e.g., frequency coefficients), and transmit that information to the spoken language detection manager 101, where the information can be further processed to complete speech recognition and language detection.

In another embodiment, the voice enabled remote-control device 100 does not include the language detection key 204 or similar input device. Instead, the voice enabled remote-control device 100 can be configured to automatically detect the beginning and/or end of a user's utterance, by using various speech activity detection techniques. Aside from transmitting audio data to the spoken language detection manager 101, the remote-control 100 may send additional signals related to speech processing, such as beginning/end of utterance signals.

In another embodiment, the spoken language detection manager 101 may be controlled by voice inputs received from a source other than the voice enabled remote-control device 100. In particular, the spoken language detection manager 101 may receive audio data representing a spoken language of the user 220 from a user device, such as a smartphone or other mobile device. For example, a traveling user might place a voice call on their cell phone or a voice-over-IP client (e.g., executing on a personal computer or mobile device). In such an embodiment, the microphone 206 of the voice enabled remote-control device 100 (or of the receiving device 118) receives the audio from the voice call and sends a signal representing the audio to the spoken language detection manager 101 such that the spoken language detection manger 101 may detect the language being spoken during the voice call and then present media via the presentation device 120 in the detected language of the voice call. In some embodiments, the user device 122 includes the functionality and capabilities of the voice enabled remote-control device 100.

Figure 3A:
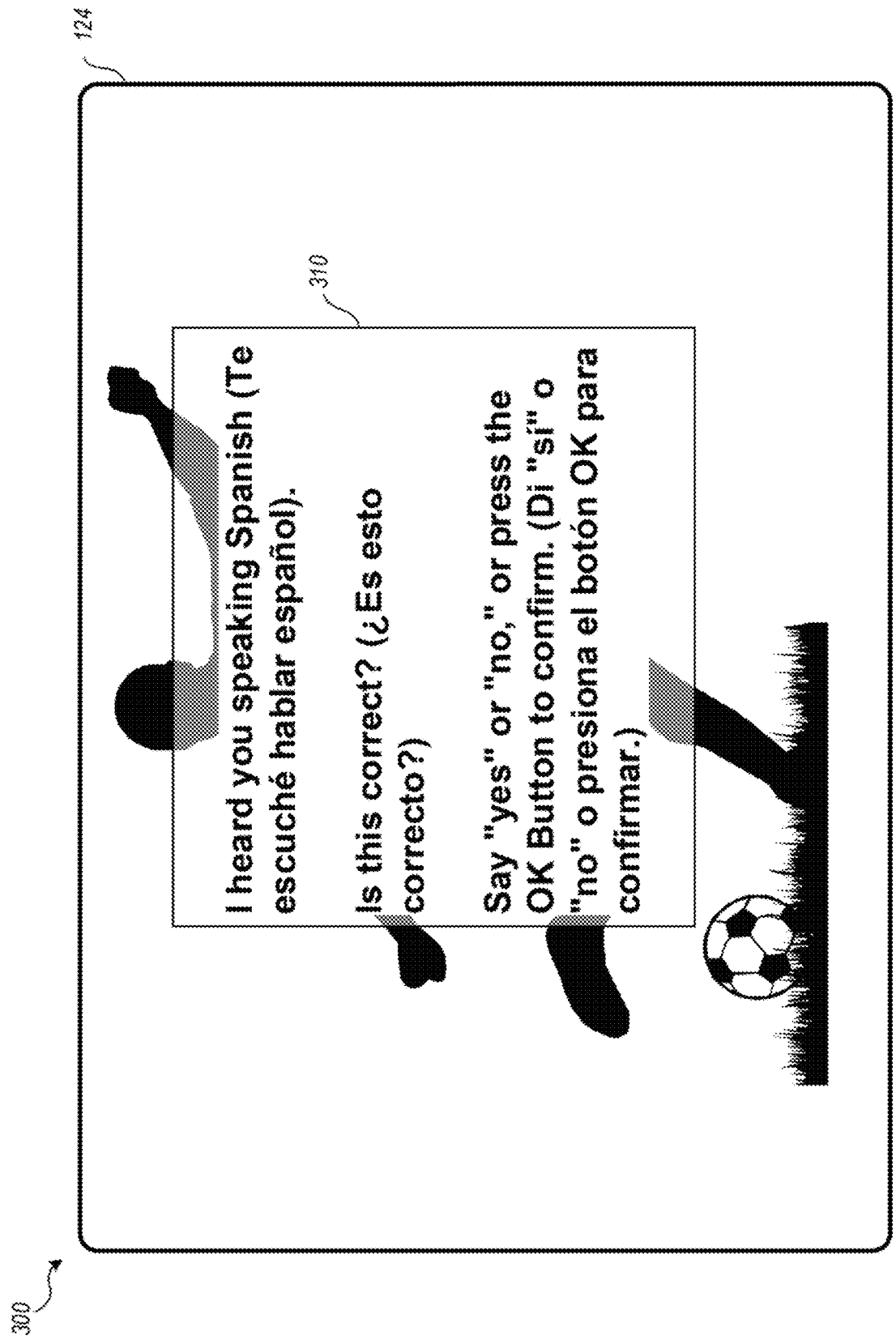
FIGS. 3A-3C are block diagrams illustrating example user interfaces provided by example embodiments.
Figure 3B:
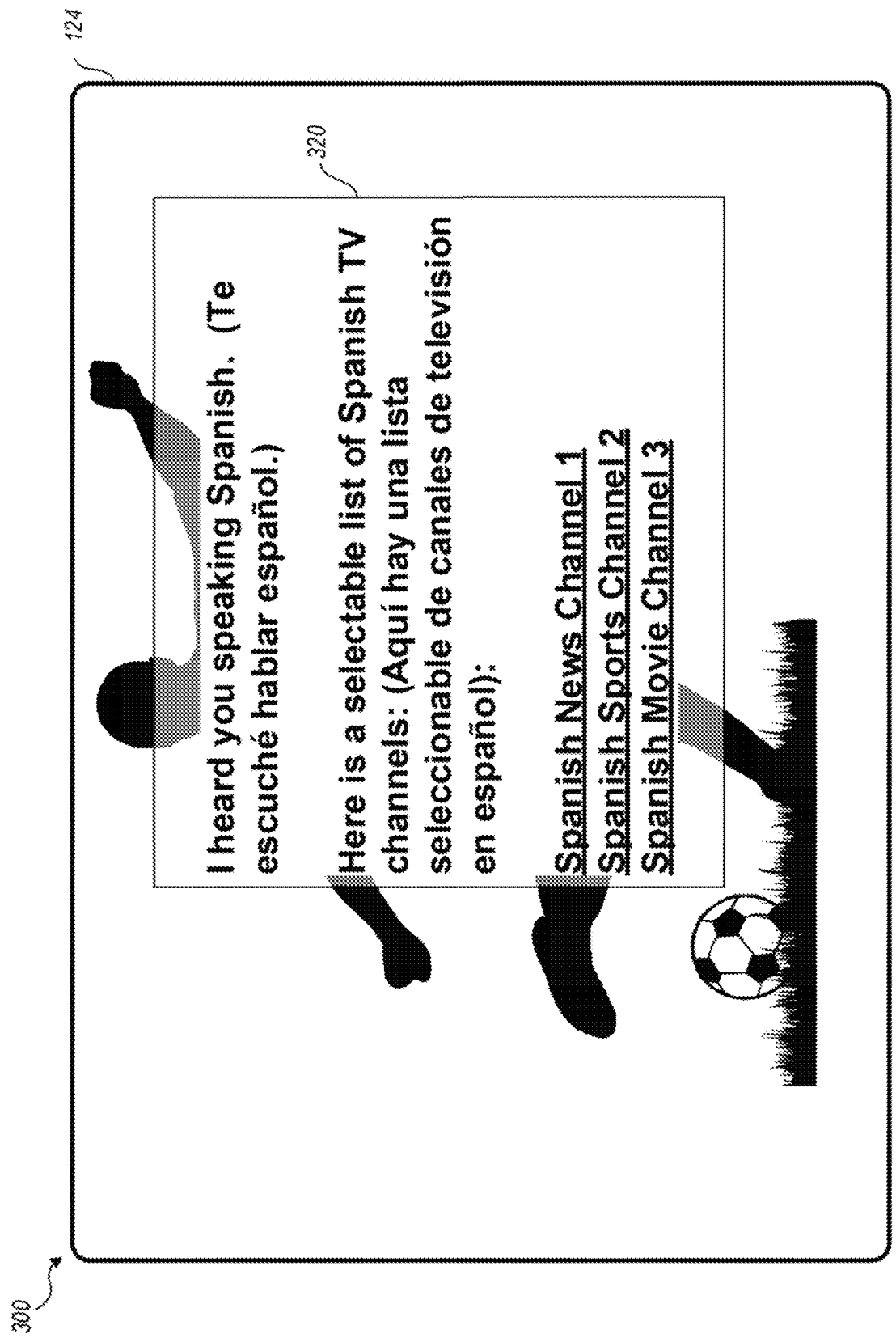
Figure 3C:
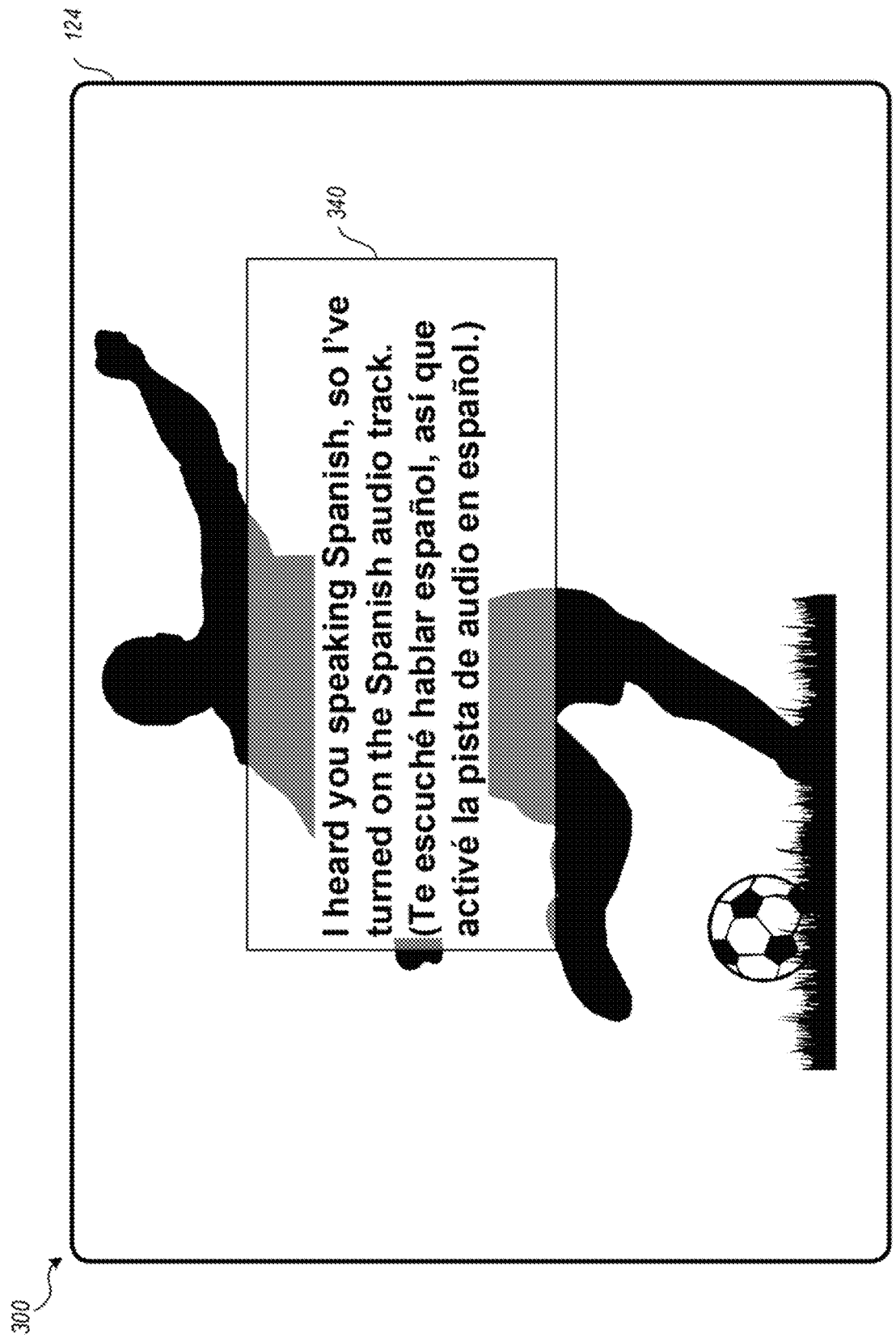

FIGS. 3A-3C are block diagrams illustrating example user interfaces provided by example embodiments. FIGS. 3A-3D illustrate various user interface elements provided by one or more example systems and methods for providing media based on a detected language being spoken. In particular, FIGS. 3A-3D show a user interface 300 displayed upon a presentation device 120 coupled to a receiving device 118 having a spoken language detection manager 101, such as is described with reference to FIG. 2. In these examples, the user interface 300 is displaying a sports program, along with additional elements that are presented in response to otherwise based on a detected language being spoken by user 220.

In the example of FIG. 3A, the language being spoken by user 220 is detected by the receiving device 118 as Spanish. In response, a prompt 310 is presented on the display 124 in both the default language (e.g., English) and the detected language (in this case, Spanish) for the user 220 to confirm that the detection of the language being spoken by the user as Spanish is correct. The user may then select "yes" or "no", by selecting an "OK" button on the remote-control device, or speaking the words "yes" or "no" (in Spanish or English). If the user 220 indicates that the detection of the language being spoken by the user as Spanish is correct, the receiving device 118 may then proceed to present additional media to the user in Spanish (e.g., the media shown in FIGS. 3B-3C). If the user 220 indicates that the detection of the language being spoken by the user as Spanish is incorrect correct, the receiving device 118 may continue to present media to the user 220 in the default language, or may ask the user for input via further prompts indicating what the preferred language is.

In the example of FIG. 3B, the system for providing media based on a detected language being spoken has displayed a selectable list of channels 320 in the detected language on the display 124. For example, the selectable list of channels 320 in the detected language (e.g., Spanish) may be displayed in response to the detection of the language spoken being Spanish. For example, the display of the selectable list of channels 320 in the detected language may occur without any intermediate or intervening operation or actions after the language being spoken is detected. In other embodiments, the selectable list of channels 320 in the detected language (e.g., Spanish) may be displayed in response to the user confirming the detection of the language being spoken as being Spanish is correct, such as in response to the prompt 310 displayed in FIG. 3A. In other embodiments, the selectable list of channels 320 in the detected language (e.g., Spanish) may be displayed the next time the user selects an EPG to be displayed based on the detected language being Spanish. In some embodiments, the selectable list of channels 320 may be part of an EPG in which the channels in the detected language are displayed first before other channels that are not in the detected language.

In the example of FIG. 3B, the system for providing media based on a detected language being spoken has displayed a notice 340 that an audio track has been changed for a program to an audio track of the detected language (e.g., Spanish). For example, in response to the detecting the language being spoken by the user 220 is Spanish, the system electronically selects an audio track for a selected program that is in Spanish (e.g., for the sports program currently being displayed on display 124 and/or a future selected program). The receiving device 118 may then switch an audio track of a program of the selected program to the selected audio track that is in Spanish. In some embodiments, this switch may be automatically performed in response to the detection of the language being spoken. In some embodiments, the notice 340 may provide an option to switch back to the previous or default audio track of the program. Also, in some embodiments, the notice 340 may first prompt the user 220 for permission before switching the audio track to the detected language.

Figure 4:
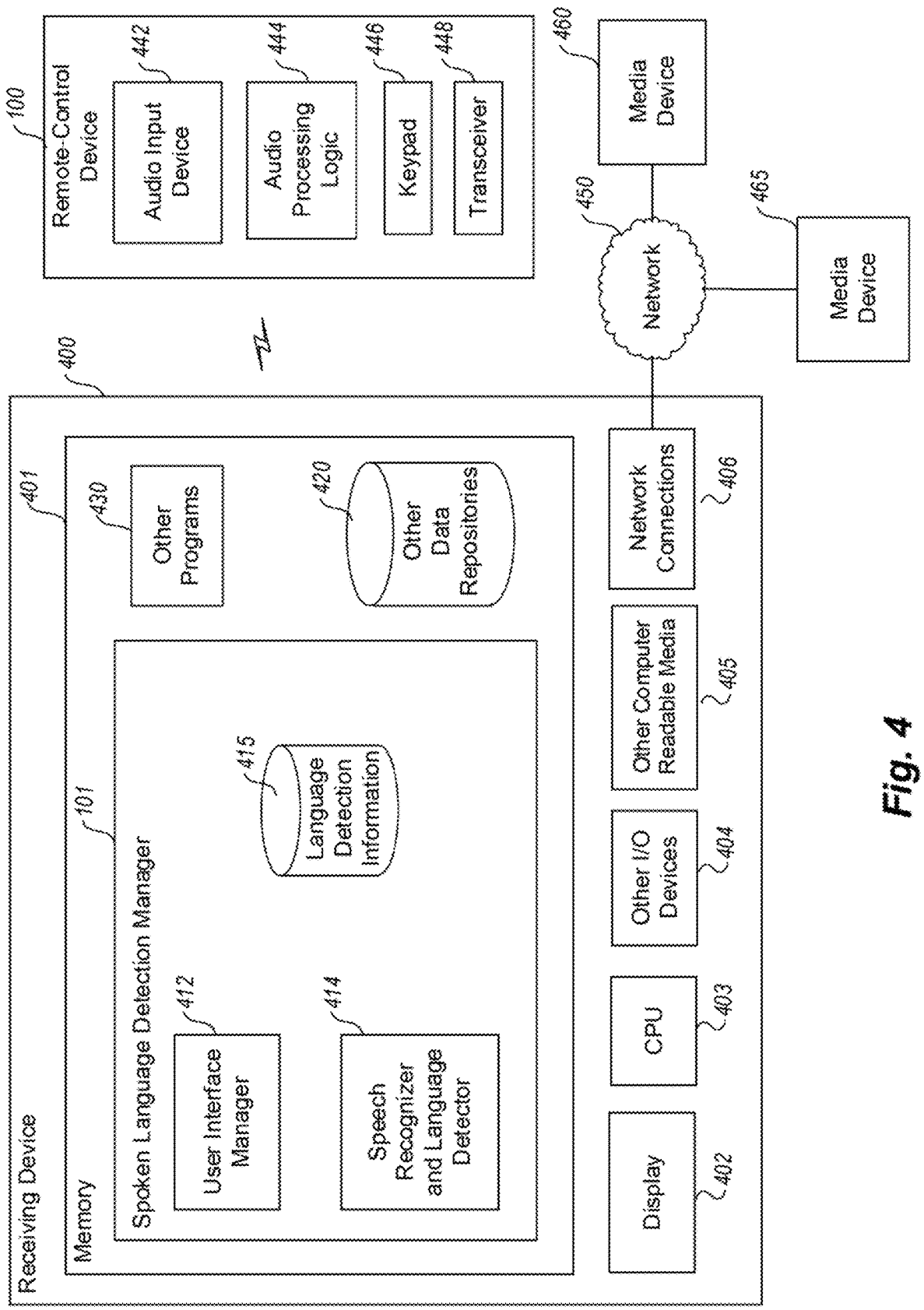
FIG. 4 is a block diagram of a computing system for practicing example embodiments of systems and methods for providing media based on a detected language being spoken.

FIG. 4 is a block diagram of a computing system for practicing example embodiments of systems and methods for providing media based on a detected language being spoken. As shown in FIG. 4, the described system for providing media based on a detected language being spoken includes a voice enabled remote-control device 100 and a receiving device computing system 400 having a spoken language detection manager 101. In one embodiment, the receiving device computing system 400 is part of a set-top box configured to receive and display programming on a presentation device. Note that the computing system 400 may comprise one or more distinct computing systems/devices and may span distributed locations. Furthermore, each block shown may represent one or more such blocks as appropriate to a specific embodiment or may be combined with other blocks. Also, components of the system for providing media based on a detected language being spoken, such as the spoken language detection manager 101 and audio processing logic 444 may be implemented in software, hardware, firmware, or in some combination to achieve the capabilities described herein.

In the embodiment shown, receiving device computing system 400 comprises a computer memory ("memory") 401, a display 402, one or more Central Processing Units ("CPU") 403, Input/Output devices 404 (e.g., keyboard, mouse, LCD or touchscreen display, and the like), other computer-readable media 405, and network connections 406. The spoken language detection manager 101 is shown residing in memory 401. In other embodiments, some portion of the contents, some of, or all of the components of the spoken language detection manager 101 may be stored on and/or transmitted over the other computer-readable media 405. The components of the spoken language detection manager 101 preferably execute on one or more CPUs 403 and facilitate spoken language detection and control of the receiving device computing system 400 and/or other media devices, as described herein. Other code or programs 430 (e.g., an audio/video processing module, an electronic program guide manager module, a Web server, and the like) and potentially other data repositories, such as data repository 420 (e.g., including stored programming), also reside in the memory 410, and preferably execute on one or more CPUs 403. Of note, one or more of the components in FIG. 4 may not be present in any specific implementation. For example, some embodiments may not include a display 402, and instead utilize a display provided by another media device, such as a display 124 of presentation device 120.

The remote-control device 100 includes an audio input device 442, audio processing logic 444, a keypad 446, and a transceiver 448. The audio input device 442 includes a microphone and provides audio data, such as digital audio samples reflecting an audio signal generated by the microphone. The audio processing logic 444 performs the processing of the audio signal, such as filtering out noise, reformatting the signal to be understood by the receiving device 118, etc. In particular, the audio processing logic 444 receives audio data from the audio input device 442 and wirelessly transmits, via the transceiver 448, the audio data to the spoken language detection manager 101. As noted, various communication techniques are contemplated, including radio frequency (e.g., UHF), microwave, infrared, short range wireless (e.g., Bluetooth®) communication, or the like. The audio processing logic 444 may also receive input events generated by the keypad 446 and transmits those events, or commands corresponding to those events, to the spoken language detection manager 101. The remote-control device 100 may include other components that are not illustrated here. For example, the voice enabled remote-control device 100 may include a speaker to provide audio output to the user, such as audible beeps, voice prompts, etc.

In a typical embodiment, the spoken language detection manager 101 includes a user interface manager 412, a speech recognizer and language detector 414, and a data repository 415 that includes language detection information (e.g., databases of languages, grammars, translators, vocabularies, etc.). The spoken language detection manager 101 is operable to determine the language being spoken by performing speech recognition upon the obtained audio data. The performed speech recognition consumes audio data as an input, and outputs one or more words (e.g., text) in particular language (e.g., as text strings) that were likely spoken by the user, as reflected by the obtained audio data. In some embodiments, the performed speech recognition may also be based upon a comparison of grammars of potential languages that specify one or more sequences of one or more words that are to be expected by the speech recognition. In some embodiments, a language identification algorithm may be used to detect which language is being spoken. Language classifications rely upon using a primer of specialized text called a "corpus". There is one corpus for each language the algorithm can identify. Because there are so many potential words to profile in every language, the spoken language detection manager 101 may use algorithms called "profiling algorithms" to create a subset of words for each language, to be used for the corpus. One strategy is to choose very common words. For example, input text strings are compared to each corpus and pattern matching is used to identify the strongest correlation to a corpus. One such algorithm is the Algorithmia Language Identification algorithm available at https://algorithmia.com. Spoken language identification may also be performed using an open source software library called "lidbox" available at https://github.com/matiaslindgren/lidbox.

Other language detection algorithms may also or instead be used, such as other various natural language processing (NLP) techniques and those utilizing neural networks (e.g., convolutional neural networks (CNN)), artificial intelligence and/or machine learning to detect what language is being spoken based on training data of audio and/or text of various different languages. For example, phonotactic models use first a phoneme recognizer to transform the audio into a phoneme sequence and then a language classifier to detect unique patterns and structures in the phoneme sequences to identify the language. Acoustic-phonetic models, on the other hand, separate languages directly in the acoustic domain, detecting the characteristic acoustic structure of each language. They only require audio files labeled by the language for training of the machine learning system.

The spoken language detection manager 101 also interacts via a network 450 with media devices 460-465. The network 450 may be include various type of communication systems, including wired or wireless networks, point-to-point connections (e.g., serial lines, media connection cables, etc.), and the like. Media devices 460-465 may include user devices (such as user device 122), video recorders, audio systems, presentation devices, home computing systems, and the like. The spoken language detection manager 101 may also include a speech synthesizer configured to convert text into speech, so that the spoken language detection manager 101 may provide audio output (e.g., spoken words) to a user in the detected language. The audio output may be provided to the user in various ways, including via one or more speakers associated with one of the media devices 460-465 or the voice enabled remote-control device 100.

The user interface manager 412 may perform some core functions of the spoken language detection manager 101. In particular, the user interface manager 412 receives audio data from the voice enabled remote-control device 100. The user interface manager 412 also receives events and/or commands from the voice enabled remote-control device 100, such as indications of button selections on the keypad 446 and/or other signaling information (e.g., a flag or other message indicating the beginning and/or end of user speech) transmitted by the voice enabled remote-control device 100.

The user interface manager 412 also interfaces with the speech recognizer and language detector 414. For example, the user interface manager 412 provides received audio data to the speech recognizer and language detector 414. The user interface manager 412 also configures the operation of the speech recognizer and language detector 414, such as by initialization, specifying speech and language recognition grammars, setting tuning parameters, and the like. The user interface manager 412 further receives output from the speech recognizer and language detector 414 in the form of recognition and language detection results, which indicate words (e.g., as text strings) that were likely uttered by the user. Recognition results provided by the speech recognizer and language detector 414 may also indicate that no recognition was possible, for example, because the user did not speak, the audio data included excessive noise or other audio signals that obscured the user's utterance, the user's utterance was not included in a recognition grammar or grammar of a particular language, or the like.

The user interface manager 412 further controls the operation of the receiving device computing system 400 based on the language detected provided by the speech recognizer and language detector 414. For example, given a detected language, the user interface manager 412 determines a command that corresponds to or is otherwise based on the particular spoken language being detected. Then, the user interface manager 412 initiates or executes the determined command, such as by presenting media such as that shown in FIGS. 3A-3C, for example. The user interface manager 412 may in some cases confirm a detected language and/or disambiguate multiple possible languages that were detected.

The language detection information stored in repository 420 may also include audio files that include pre-recorded audio prompts or other messages in various applicable languages that may be played by the spoken language detection manager 101 to interact with a user based on the particular language that is detected being spoken by the user 220. The language detection information may further include logging information, such as recordings of audio data received by the spoken language detection manager 101, language detection results received from the speech recognizer and language detector 414, and the like. Such data may also be used to train an AI model to more accurately detect the language being spoken in the future.

In an example embodiment, components/modules of the spoken language detection manager 101 and the audio processing logic 444 are implemented using one or more various programming techniques. For example, the audio processing logic 444 may also be implemented as a sequence of "native" instructions executing on a CPU (not shown) of the voice enabled remote-control device 100. In addition, the spoken language detection manager 101 may be implemented as a native executable running on the CPU 403, along with one or more static or dynamic libraries. In other embodiments, the spoken language detection manager 101 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a system for providing media based on a detected language being spoken implementation. Also, other functions could be implemented and/or performed by each component/module, and in different orders, and by different components/modules, yet still achieve the functions of the system for providing media based on a detected language being spoken.

In addition, programming interfaces to the data stored as part of the spoken language detection manager 101, such as in the data repository 415, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 415 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a system for providing media based on a detected language being spoken.

In particular, all or some of the spoken language detection manager 101 and/or the audio processing logic 444 may be distributed amongst other components/devices. For example, the speech recognizer and language detector 414 may be located on the voice enabled remote-control device 100 or on some other system, such as a smartphone, mobile device, or remote server accessible via the network 450.

Furthermore, in some embodiments, some or all of the components of the spoken language detection manager 101 and/or the audio processing logic 444 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5:
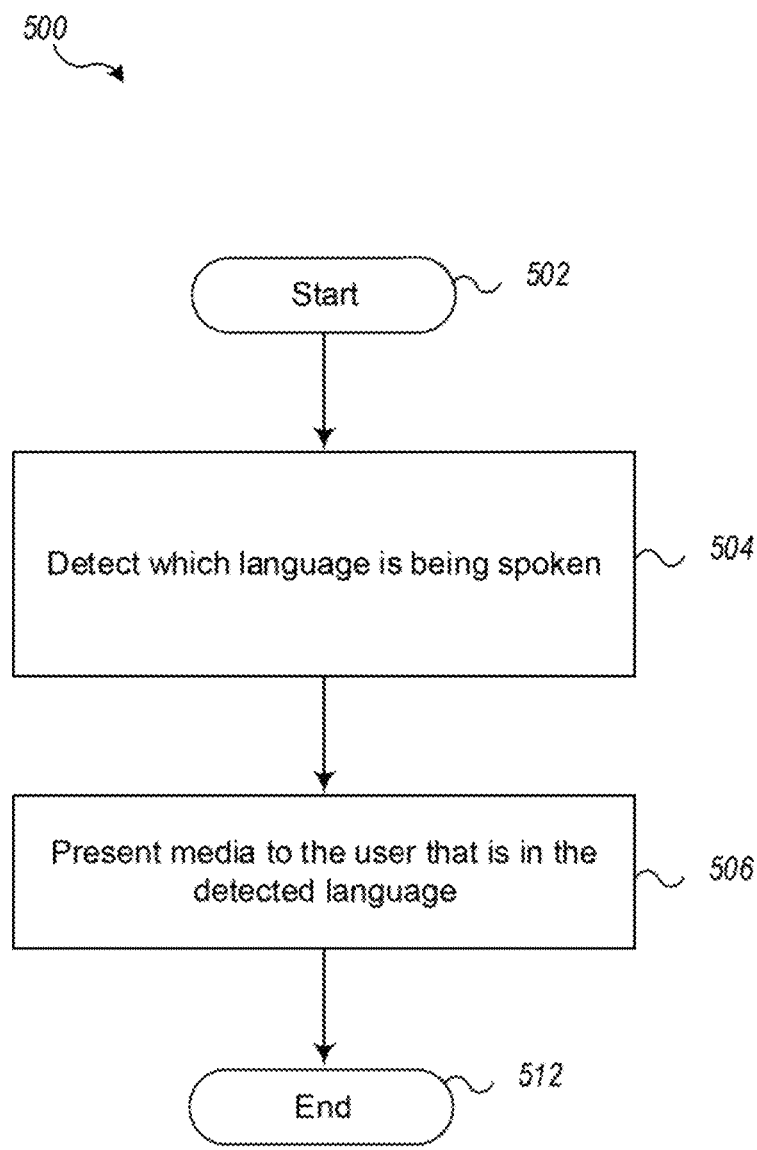
FIG. 5 is a flow diagram a method for providing media based on a detected language being spoken, according to an example embodiment.
Figure 6:
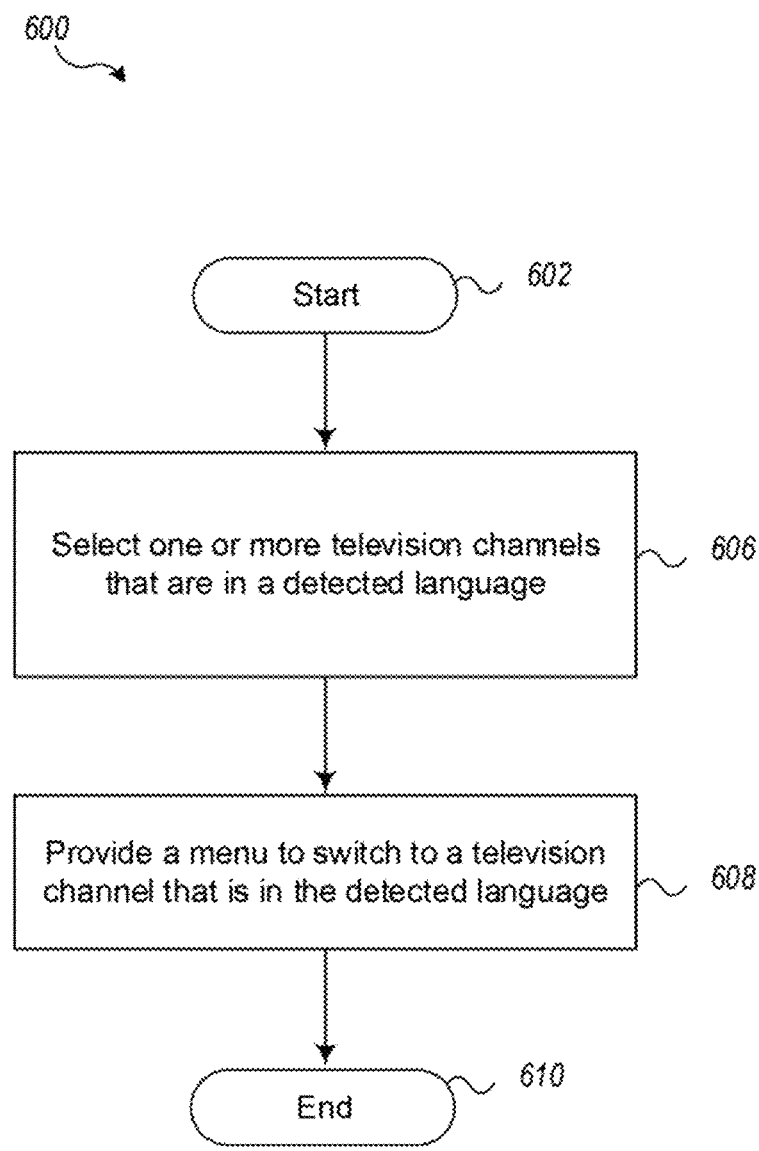
FIG. 6 is a flow diagram of a method for providing a menu to switch to a television channel that is in a detected language, according to an example embodiment.
Figure 7:
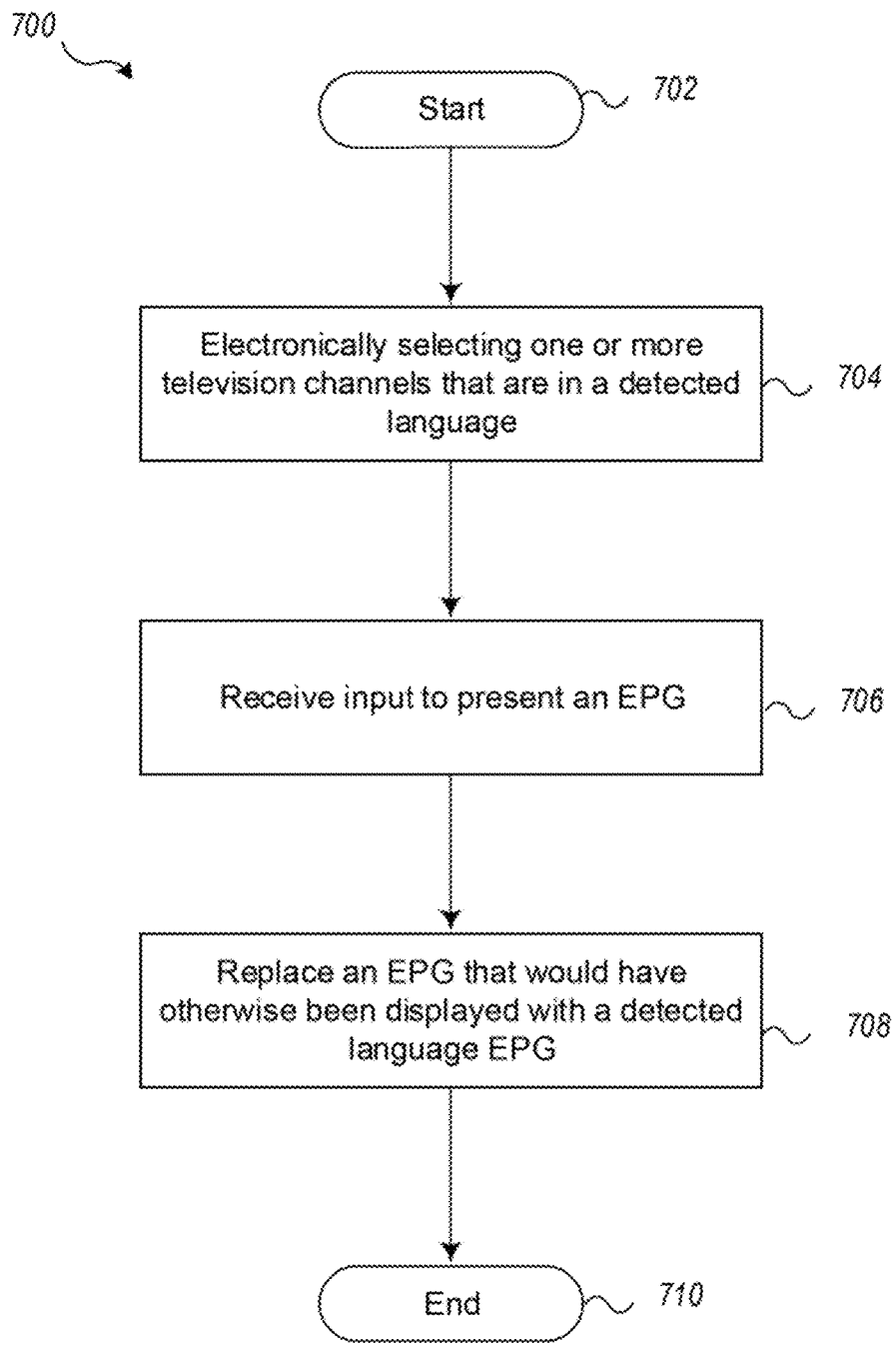
FIG. 7 is a flow diagram of a method for providing a detected language electronic program guide (EPG), according to an example embodiment.

FIGS. 5-7 are flow diagrams of various processes provided by example embodiments. FIGS. 5-7 illustrates processes that may be implemented by, for example, one or more modules/components of the receiving device computing system 400 and the voice enabled remote-control device 100, such as the spoken language detection manager 101 and the audio processing logic 444, as described with respect to FIG. 4.

FIG. 5 is a flow diagram a method 500 for providing media based on a detected language being spoken, according to an example embodiment. The illustrated method 500 starts at 502.

At 504, the method 500 electronically detects which language of a plurality of languages is being spoken by a user. For example, the method 500 may receive audio of a user's voice at a microphone of a device on which media is presented. The method 500 then converts the audio to data representing audio of the user's voice and performs speech recognition on the data representing audio of the user's voice that discerns between the plurality of languages. The method 500 may then identify which language of the plurality of languages is being spoken by the user as the user is speaking based on the speech recognition on the data representing audio of the user's voice.

At 506, based on which language of a plurality of languages is being spoken by the user, the method electronically presents media to the user that is in the detected language. The method 500 may electronically select one or more television channels (or programs) that are in the detected language in response to the electronically detecting which language is being spoken by the user. The programs may be audio or video programs. The method 500 may automatically present, on a television, a selectable list of the one or more television channels and/or programs that are in the detected language. The method 500 may also play an audio prompt in the detected language when presenting the pop-up prompting the user to select from the selectable list of the one or more television channels that are in the detected language.

In some embodiments, the method 500 may present a pop-up menu on a screen of the television overlaid on a current television channel being presented on the television screen that includes the selectable list of the one or more television channels that are in the detected language. The method 500 may also play an audio prompt in the detected language when presenting the pop-up menu prompting the user to select from the selectable list of the one or more television channels that are in the detected language. In some embodiments, the method 500 may receive input indicative of a selection from the pop-up menu a particular one of the one or more television channels that are in the detected language. In response to receiving the input indicative of the selection from the pop-up menu, the method 500 may switch the television to the selected particular television channel that is in the detected language.

In some embodiments, the method 500 may determine whether a current audio track of program being played on a device is in the detected language. In response to a determination that the current audio track of the program being played on the device is not in the detected language, the method 500 may determine whether the current program being played on the device includes an audio track that is in the detected language. In response to determining the current program being played on the device includes an audio track that is in the detected language, the method 500 may automatically switch to the audio track of the program being played that is in the detected language.

In some embodiments, the method 500 may, in response to the detecting which language of a plurality of languages is being spoken by a user, electronically select audio captions that are in the detected language. The method 500 may then presenting the audio captions that are in the detected language on a program currently being displayed.

The method 500 ends at 512.

FIG. 6 is a flow diagram a method 600 for providing a menu to switch to a television channel that is in a detected language, according to an example embodiment. The illustrated method 600 starts at 602.

At 604, the method 600 electronically selects one or more television channels that are in a detected language in response to electronically detecting which language is being spoken by the user. For example, for each television channel of a plurality of television channels, the method 600 may determine which language the television channel is in based on metadata associated with the television channel indicating a language the television channel is in. In some embodiments, the metadata may be received along with a program content signal, program content stream or EPG data. The language of the television channel may also or instead be identified based on the identification or association of the particular channel in the EPG with a particular language and/or titles of programs on the channel being in a particular language. The method then selects from the plurality of television channels, television channels that were determined to be in the detected language.

In other embodiments, for each television channel of the plurality of television channels, the method 600 receives as input one or more audio samples of content of the television channel and then performs speech recognition on data representing the one or more audio samples of content of the television channel. The method 600 then determines which language the television channel is in based on the speech recognition on the data representing the one or more audio samples of content of the television channel and selects, from the plurality of television channels, television channels that were determined to be in the detected language.

At 606, the method 600 provides a menu to switch a television to a television channel that is in the detected language based on the electronic detection of which language is being spoken by the user.

The method 600 ends at 610.

FIG. 7 is a flow diagram a method 700 for providing a detected language electronic program guide (EPG), according to an example embodiment. The method 700 starts at 702.

At 704, the method 700 electronically selects one or more television channels that are in the detected language in response to electronically detecting which language is being spoken by the user. In some embodiments, the electronic detection of which language is being spoken by a user is performed by a remote control device of a television.

At 706, the method 700 receives input to present an EPG.

At 708, in response to the input to present the EPG, the method 700 automatically replaces an EPG that would have otherwise been displayed on a television with a detected language EPG that includes a selectable list of the one or more television channels that are in the detected language and filters out channels that are not in the detected language. For example, a French EPG may be presented based on the language being spoken by a user being detected as French.

While various embodiments have been described hereinabove, it is to be appreciated that various changes in form and detail may be made without departing from the spirit and scope of the invention(s) presently or hereafter claimed.

The invention claimed is:

1. A method comprising:
electronically detecting, by at least one computer processor, which language of a plurality of languages is being spoken by a user; and
based on which language of a plurality of languages is being spoken by the user, electronically presenting, by at least one computer processor, media to the user that is in the detected language, wherein the presenting the media to the user that is in the detected language includes:
electronically selecting one or more television channels that are in the detected language in response to the electronically detecting which language is being spoken by the user;
receiving input to present an electronic program guide (EPG); and
in response to the input to present the EPG, automatically replacing an EPG that would have otherwise been displayed on a television with a detected language EPG that includes a selectable list of the one or more television channels that are in the detected language first before other channels that are not in the detected language.

2. The method of claim 1 wherein the electronically presenting media to the user that is in the detected language further includes:
presenting a pop-up menu on a screen of the television overlaid on a current television channel being presented on the television screen that includes the selectable list of the one or more television channels that are in the detected language.

3. The method of claim 2, further comprising:
playing an audio prompt in the detected language when presenting the pop-up menu prompting the user to select from the selectable list of the one or more television channels that are in the detected language.

4. The method of claim 2, further comprising:
receiving, by at least one computer processor, input indicative of a selection from the pop-up menu a particular one of the one or more television channels that are in the detected language; and
in response to receiving the input indicative of the selection from the pop-up menu, switching, by at least one computer processor, the television to the selected particular television channel that is in the detected language.

5. The method of claim 1 wherein the electronically presenting the media to the user that is in the detected language further includes:
electronically selecting one or more programs that are in the detected language in response to the electronically detecting which language is being spoken by the user; and
automatically presenting on a device a selectable list of the one or more programs that are in the detected language.

6. The method of claim 5 wherein the one or more programs include one or more of: an audio program in the detected language and a video program in the detected language.

7. The method of claim 1 wherein the electronically detecting which language of a plurality of languages is being spoken by a user includes:
receiving data representing audio of the user's voice from a remote control device that controls a device on which the media is presented;
performing speech recognition on the data representing audio of the user's voice that discerns between the plurality of languages; and
identifying which language of the plurality of languages is being spoken by the user as the user is speaking based on the speech recognition on the data representing audio of the user's voice.

8. The method of claim 1 wherein the electronically detecting which language of a plurality of languages is being spoken by a user includes:
receiving audio of the user's voice at a microphone of a device on which the media is presented;
converting the audio to data representing audio of the user's voice;
performing speech recognition on the data representing audio of the user's voice that discerns between the plurality of languages; and
identifying which language of the plurality of languages is being spoken by the user as the user is speaking based on the speech recognition on the data representing audio of the user's voice.

9. The method of claim 1 wherein the electronically presenting the media to the user that is in the detected language further includes:
automatically switching to a television channel that is in the detected language in response to the electronically detecting which language is being spoken by the user.

10. The method of claim 9 wherein the selecting one or more television channels that are in the detected language includes:
for each television channel of a plurality of television channels, determining which language the television channel is in based on metadata associated with the television channel indicating a language the television channel is in; and
selecting, from the plurality of television channels, television channels that were determined to be in the detected language.

11. The method of claim 1 wherein the presenting the media to the user that is in the detected language further includes:
in response to the detecting which language of a plurality of languages is being spoken by a user, electronically selecting audio captions that are in the detected language; and
presenting the audio captions that are in the detected language on a program currently being displayed.

12. The method of claim 1 wherein the electronically detecting which language of a plurality of languages is being spoken by the user includes detecting which language of a plurality of languages is being spoken by the user from a conversation the user is having with another person.

13. A non-transitory computer-readable storage medium having computer-executable instructions stored thereon that, when executed by at least one processor, cause a system to perform:
electronically selecting one or more television channels that are in a detected language in response to electronic detection of which language is being spoken by a user;
receiving input to present an electronic program guide (EPG); and
in response to the input to present the EPG, automatically replacing an EPG that would have otherwise been displayed on a television with a detected language EPG that includes a selectable list of the one or more television channels that are in the detected language first before other channels that are not in the detected language.

14. The non-transitory computer-readable storage medium of claim 13 wherein the electronic detection of which language is being spoken by a user is performed by a remote control device of the television.

15. A system comprising:
at least one processor; and
at least one memory coupled to the at least one processor wherein the at least one memory has computer-executable instructions stored thereon that, when executed by at least one processor, cause the system to perform:
electronically selecting one or more television channels that are in a detected language in response to electronic detection of which language is being spoken by a user;
receiving input to present an electronic program guide (EPG); and
in response to the input to present the EPG, automatically replacing an EPG that would have otherwise been displayed on a television with a detected language EPG that includes a selectable list of the one or more television channels that are in the detected language first before other channels that are not in the detected language.

16. The system of claim 15 wherein the computer-executable instructions, when executed by at least one processor, further cause the system to perform:

in response to the detecting which language of a plurality of languages is being spoken by a user, electronically selecting an audio track that is in the detected language; and switching an audio track of a program currently being displayed to the selected audio track that is in the detected language.

\* \* \* \* \*